United States Patent [19]

Marshall et al.

[11] Patent Number: 5,275,646
[45] Date of Patent: Jan. 4, 1994

[54] INK COMPOSITION

[75] Inventors: Allan Marshall, Lincs; Alan L. Hudd, Herts, both of England

[73] Assignee: Domino Printing Sciences Plc, Cambridge, United Kingdom

[21] Appl. No.: 912,577

[22] Filed: Jul. 13, 1992

Related U.S. Application Data

[63] Continuation-in-part of Ser. No. 720,155, Jun. 27, 1991, abandoned.

[30] Foreign Application Priority Data

Jun. 27, 1990 [GB] United Kingdom ............... 9014299
Oct. 30, 1991 [GB] United Kingdom ............... 9123070

[51] Int. Cl.$^5$ ............................................. C09D 11/02
[52] U.S. Cl. ................................ 106/20 B; 106/20 D; 106/22 R; 427/511; 346/1.1
[58] Field of Search .................... 106/20; 427/54.1; 346/1.1

[56] References Cited

U.S. PATENT DOCUMENTS

| 4,186,020 | 1/1980 | Wachtel | 106/26 R |
| 4,256,493 | 3/1981 | Yokoyama et al. | 106/26 R |
| 4,303,924 | 12/1981 | Young, Jr. | 106/22 R |
| 4,340,707 | 7/1982 | Quis et al. | 427/54.1 |

FOREIGN PATENT DOCUMENTS 407054  1/1991  European Pat. Off. .

Primary Examiner—Helene Klemanski
Attorney, Agent, or Firm—Venable, Baetjer, Howard & Civiletti

[57] ABSTRACT

An ink-jet ink comprises a colorant and a liquid phase consisting essentially of polymerisable monomers. For continuous printing, the ink also includes a conductive component that is soluble in the liquid phase. No methanol, ethanol, MEK or other such low molecular weight organic solvent is required.

17 Claims, No Drawings

INK COMPOSITION

RELATION TO PRIOR APPLICATION

This Application is a continuation-in-part of our Application Ser. No. 720,155, filed Jun. 27, 1991, now abandoned.

FIELD OF THE INVENTION

This invention relates to ink-jet inks.

BACKGROUND OF THE INVENTION

Ink-jet printing is a technique which puts a number of constraints on the nature of the ink which is used. These constraints include low viscosity (usually less than 50 cP or, for continuous operation, less than 10 cP at 25° C.), sufficient surface tension that the jet can produce the necessary large number of small droplets, and (at least for continuous operation) sufficient conductivity that the droplets can be directed as desired onto a substrate to be printed. The ink must be a homogeneous liquid capable of rapid conversion to a dry printed area on the substrate.

Hitherto, these constraints have been satisfactorily met by the use of ink-jet inks comprising a binder, a colourant, a conductive component and, as a major component of the liquid phase, low molecular weight organic solvents. In order to obtain the desired combination of solubility and drying characteristics, a mixture of several solvents may be used but, in order to achieve rapid drying, they are highly flammable, volatile solvents such as methyl ethyl ketone and ethanol.

Known ink-jet inks may be UV-curable. For example, the binder component is a pre-polymer, usually of high functionality.

The concept of piezoelectric ink-jet printing is based on the movement of a piezoelectric ceramic transducer when a voltage is applied to it. When the voltage is applied, the length of the ceramic decreases, creating a void which is filled with ink. When the voltage is removed, the ceramic expands to its full length and the excess ink is repelled, ejecting a drop of ink from the printhead. A fresh drop of ink is expelled on demand.

Inks for use in piezoelectric drop-on-demand ink-jet printing traditionally comprise a mixture of fatty acids, fatty esters and oil-soluble dyes. Such inks should be slow-drying, to prevent clogging of the nozzles; this constraint results in the process being suitable only for surfaces where the ink may dry through absorption On non-absorbent surfaces, the ink remains wet for an undesirably long period of time.

U.S. Pat. No. 4,303,924 discloses a radiation-curable ink-jet ink comprising, in addition to a colourant and a conductive component, 0 to 90% of monofunctional polymerisable monomer and 5 to 80% of multifunctional polymerisable monomer. The colourant is a dye. The conductive component is oil-soluble. It is indicated that there may be 0% organic solvent, but all the given Examples contain more than 10% of such a solvent which, together with the high content of trifunctional monomer, provides a liquid phase in which the conductive component is soluble. If such solvent were absent, there would be no solvent for the conductive component, and it is unlikely that the viscosity of the ink would be sufficiently low for ink-jet printing. Further, the presence of non-polymerisable organic solvent such as methanol or ethanol presents the problem that the ink may dry in an open nozzle. The ink must apparently be used in an inert gas atmosphere, which is a considerable disadvantage.

European Patent Publication No. 407054 discloses an ultra-violet jet ink comprising a curable adhesive thinned with solvents which, at least in the Examples, invariably include at least the organic solvent methyl ethyl ketone. This composition also presents the problem that the ink may dry in the nozzle.

An object behind the present invention has been to provide an ink-jet ink which meets the given constraints but which avoids the use of volatile, flammable, environmentally-undesirable solvents, and can be used in air.

SUMMARY OF THE INVENTION

An ink-jet ink according to a first aspect of the present invention comprises a colourant, a polar conductive component and, as the or a major component of at least the liquid phase, one or more polymerisable monomers in which the conductive component is soluble.

An ink according to a second aspect of the present invention is non-conductive, and is suitable for use in piezoelectric drop-on-demand systems. By comparison with the ink of the first aspect, no conductive component is required, and the viscosity may be somewhat higher, e.g. up to 40 or 50 cP at 25° C.; therefore, the novel composition may comprise a higher colourant content, providing enhanced contrast, and also an additional component that is a polymeric or other material having a thickening or other function, e.g. providing enhanced adhesion to a printed substrate.

An ink of the invention has a number of desirable characteristics and advantages, which are summarised below. Perhaps most importantly, inks of the invention are suitable for all types of ink-jet printing, e.g. bubble jet as other drop-on-demand printing, based on non-volatile monomer molecules. Such monomer molecules are thermally-stable, non-flammable, low viscosity liquids and exhibit low odour and low toxicity. These liquids are designed to replace all traditional volatile solvents and binders used in known ink-jet formulations. The ink may also be designed with these or a range of solvents and binders.

DESCRIPTION OF THE INVENTION

An ink-jet formulation of the invention will usually comprise mixtures of monomers possessing different degrees of functionality, including combinations of mono, di, tri and higher functionality material. Such materials are capable of being cured by the application of UV irradiation, for which purpose the formulation may contain a photoinitiator and/or a photoactivator. Further, in addition to a colourant and a conductive component, the formulation may comprise conventional ingredients such as stabilisers, surfactants and wetting agents.

In a continuous ink-jet printer, the unused solvent-free ink can be recycled, and remains stable to heat, moisture and oxidation. Upon continuous or drop-on-demand printing, the droplet of ink is delivered to the substrate surface and converted to a dry film or dot by polymerising the monomer molecules by the action of an external energy source, adjacent to the printer, focused on the printing area. As an example, the external energy source may be a UV light source. The UV light source initiates the polymerisation process, which typically takes less than 5 msec (continuous) or less than 0.5 sec (drop-on-demand). The preferred choice of light source emits UV-A light only, e.g. at a wavelength of 315–400 nm, eliminating the need for extraction due to the production of ozone found with UV-B or UV-C light sources.

The choice of materials is wide and will depend on the application and properties required. As a means to highlight the principle, an ink-jet formulation may be designed to provide high solvent resistance by incorporating a relatively large proportion of higher functional monomer, thus producing, once cured, a highly cross-linked insoluble film.

A range of commercial monomers, e.g. having acrylic, vinyl or epoxy functional groups, photoinitiators and photoactivators is available and suitable for use in an ink-jet formulation, capable of polymerisation by UV light. The reaction may proceed through addition polymerisation; all reactants are converted to the final polymeric binder, leaving no by-product or trace of liquid. This reaction can proceed in two ways, either by a free-radical mechanism or by the formation of a cationic species.

Suitable monofunctional monomers that cure by a free-radical mechanism include vinyl compounds and (meth)acrylic acid esters. Specific examples are octyl acrylate, decyl acrylate, nonylphenol ethoxylate acrylate, N-vinylpyrrolidone, ethyl diglycol acrylate, isobornyl acrylate, ethylhexyl acrylate, lauryl acrylate, butanediol monoacrylate, β-carboxyethyl acrylate, isobutyl acrylate, polypropylene glycol monomethacrylate and 2-hydroxyethyl methacrylate.

Suitable monofunctional monomers that cure by a cationic mechanism include vinyl ethers, monofunctional cycloaliphatic epoxides and α-epoxides. A specific example is isodecyl glycidyl ether.

It is preferred that some monofunctional monomer is present in the novel ink, since such materials will solubilise polar conductive materials, and have low viscosity. However, such materials will not usually be the sole polymerisable component, since some cross-linking is desirable, in order that polymerisation leads rapidly to a dry ink. The amount of monofunctional monomer in the formulation may be up to 70%, e.g. 25 to 60%, by weight.

In order to provide a balance of properties, the novel ink will almost invariably include some difunctional material, e.g. in an amount of up to 70%, preferably 20 to 60%, more preferably 30 to 50%, by weight of the formulation. Lower difunctional monomer contents are associated with longer ink drying times.

Suitable difunctional monomers that cure by a free-radical mechanism include difunctional (meth)acrylic acid esters, e.g. hexanediol di(meth)acrylate, tetraethylene glycol diacrylate, tripropylene glycol diacrylate, butanediol diacrylate, polyethylene glycol diacrylates and triethylene glycol dimethacrylate. Suitable difunctional monomers that cure by a cationic mechanism include triethylene glycol divinyl ether, 1,4-cyclohexanedimethanol divinyl ether, butanediol diglycidyl ether and difunctional cycloaliphatic epoxide resins.

Trifunctional monomers which may used in the invention include ethoxylated trimethylolpropane triacrylate. If present (for the reasons given above), tri- or higher functional components will usually comprise up to 10% by weight of the formulation.

Di- and higher-functional monomers are not usually solvents for the polar conductive component. The lower functional monomers comprise at least the major component of the liquid phase. The total content of polymerisable monomers in the ink will usually be 50 to 95%, e.g. at least 70% and often at least 80%, by weight of the formulation.

Suitable photoinitiators, especially for free-radical curing, include 2-hydroxy-2-methyl-1-phenylpropan-1-one, acrylic ketones, 1-hydroxycyclohexyl phenyl ketone, 2-methyl-1-[4-(methylthio)phenyl]-2-morpholinylpropanone, 2,2-dimethoxy-1,2-diphenylethan-1-one, benzophenone, isopropylthioxanthone and p-phenylbenzophenone. A photoinitiator suitable for the cationic curing mechanism is a triarylsulphonium hexafluoroantimonate salt.

Suitable photoactivators and photosynergists include ethyl 4-(dimethylamino)benzoate, N-methyldiethanolamine and 2-ethylhexyl dimethylaminobenzoate. Such materials will generally be required only for free-radical curing. An ink of the invention may comprise 0 to 5% by weight photoactivator.

The choice of colourant for a monomer-based ink-jet ink is important, but it is possible to produce either a dye-based monomer ink or a disperse pigmented monomer-based ink of the invention. The use of pigment can provide faster curing, reflecting faster printing and enhanced solvent resistance. An ink of the invention may comprise 0.5 to 5% by weight colorant.

A range of colours can be achieved, including black. The problem with known black UV-curable inks is the strong absorbance of light, preventing successful curing or polymerisation. A black ink of the invention may comprise a mixture of dyes of different colours, which allows UV light at a discrete wavelength to penetrate and to initiate polymerisation, to produce a black-coloured film.

Suitable colourants include carbon black pigment, titanium dioxide pigment, ink-jet dyes including metal azo complex dyestuffs and mixtures of coloured dyestuffs. The colourant may be present in dispersion, if necessary in the form of particles coated with a material, e.g. a polymer, that is compatible with the liquid phase components.

It has been found that not all conductive salts used in conventional ink-jet formulations are suitable for the purposes of this invention, since they may catalyse the breakdown of photoinitiator and initiate polymerisation. However, satisfactory water-soluble polar salts have been identified, including potassium thiocyanate (most preferred). Other suitable conductive salts include lithium nitrate, lithium nitrate trihydrate, ammonium thiocyanate and dimethylamine hydrochloride, and also tetrabutylammonium tetrafluoroborate.

Stabilisers such as triethanolamine have been shown to inhibit possible breakdown of photoinitiators. An example of another stabiliser that may be used is ethylene glycol. Conventional wetting agents may be included in the formulation, as may be industrial organic solvent-based surfactants.

More specifically, a general-purpose or solvent-resistant ink-jet ink for continuous printing, that can be cured by a free-radical mechanism using a medium-pressure 150 mm (6-inch) mercury arc lamp operating at 12 W/mm (300 W/in) and at a wavelength of approx. 200-300 nm, or equivalent, comprises 0.5 to 5% conductive salt, 1 to 10% photoinitiator, 0.5% photoactivator, 0.05 to 5% colourant and 0 to 2% additive, the balance being up to 50% monofunctional monomer, up to 50% difunctional monomer and 0 to 10% trifunctional monomer (the percentages are by weight of the ink formulation).

A similar formulation, that cures under a UV-A light source (wavelength 315-400 nm) does not include photoactivator.

Another similar formulation, but without either photoactivator or trifunctional monomer, is curable by a cationic mechanism using the medium-pressure mercury arc lamp or equivalent (200-300 nm) or a UV-A light source.

Another general-purpose and solvent-resistant ink-jet ink for continuous printing, and curable by a combination of cationic and free-radical mechanisms, using the medium-pressure mercury arc lamp or equivalent (200-300 nm), comprises 1 to 6% photoinitiator for free-radical polymerisation, to 15% photoinitiator for cationic polymerisation, 0.5 to 5% conductive salt, 0.5 to 5% colourant and 0 to 2% additives, the balance comprising up to 30% of each of four types of monomer, i.e. mono- and di-functional monomers respectively curing by a free-radical or cationic mechanism.

In addition to a colourant, the formulation may comprise conventional ingredients such as stabilisers, surfactants, wetting agents, polymers and viscosity modifiers. Such additives are particularly suitable when the ink has relatively high viscosity, for drop-on-demand applications.

The additional component may be a polymer incorporated in order to increase the viscosity of the monomer blend, but may also be used to improve the adhesion and mechanical properties of the printed droplet. The range of suitable polymers is vast; suitable polymers include polyvinyl butyral, nitrocellulose, polyketones, polyamides, polyesters, and acrylic materials. The amount of this component in the formulation is, for example, 1 to 25%, e.g. about 5% by weight. Polymeric or further polymerizable material may be incorporated into the ink of the invention in order to provide increased viscosity of the ink of up to 50cP at 25° C.

Alternatively, an ink-jet formulation of the invention may comprise a combination of low molecular weight multifunctional ethylenically-unsaturated or epoxy functional prepolymers with low viscosity monomers of various functionalities. Such materials are capable of being cross-linked by the application of ultraviolet light, for which purpose the formulation may contain a photoinitiator and/or a photoactivator.

A wide range of commercial prepolymers, e.g. having acrylic, vinyl, thiol or epoxy functional groups, photoinitiators and phototactivators is available. Such materials are suitable for use in an ink-jet formulation, capable of polymerisation by UV light. The reaction may proceed through addition polymerisation; all the reactants are converted to the final polymeric binder, leaving no by-products or trace of liquid. This reaction can proceed in two ways, either by a free-radical mechanism or by the formation of an ionic species.

Suitable prepolymers which may react through the free-radical polymerisation include epoxy acrylates, polyester acrylates and polyurethane acrylates. Suitable prepolymers which may cross-link through a cationic mechanism include cycloaliphatic epoxides, and multifunctional vinyl ethers.

Cationic-polymerisable formulations of the type described above may also include hydroxyl-containing materials that copolymerise with the epoxide materials by acting as cabin-transfer agents, improving the formulation cure speed. These materials may also be used to improve the flexibility of the final cured material.

It is also possible to combine the use of cationic and free-radical reactive materials in the same formulation. Such a hybrid system can show improved cure speed over purely cationic systems. The hybrid system also possesses better mechanical properties, e.g. with respect to adhesion and abrasion resistance, in the cured state than the free radical systems alone.

In summary, the novel inks can provide the following advantages and characteristics, inter alia: solvent-free (no volatile solvents); non-inflammable; no change in viscosity due to solvent loss; no drying out; no solvent extraction or monitoring; low toxicity; low odour; solvent resistance to MilSpec 202F; general purpose coding and marking ink; fast cure times; high conductivity, i.e. at least 70 m$\Omega$/mm; stable to elevated temperature, moisture and oxidation; stable to the presence of conductive salts; can be black; UV-A (or UV-B/UV-C) light-activated; no ozone production; (if desired) viscosity less than 10, e.g. 5-6, cP at 25° C.: (if desired) allows fast continuous printing, e g. at 1.5-2 m/sec The following Examples 1 and 2 illustrate the first, and Examples 3 and 4 the second, aspect of this invention. All amounts are given in parts by weight.

EXAMPLE 1

To 1600 parts N-vinyl-2-pyrrolidinone were added 60 parts KSCN and 160 parts 2,4,6-trimethylbenzoyl diphenylphosphine oxide, and mixed until dissolved. Hexanediol diacrylate (1000 parts) was added quickly, with stirring.

Separately, 200 parts of a pigment-in-polymer-in-monomer dispersion were prepared by dissolving 32 parts polyvinylbutyral in 128 parts N-vinyl-2-pyrrolidinone, adding 40 parts carbon black and, after pre-dispersion, bead-milling the dispersion to a particle size no greater than 1 $\mu$m. The mixture obtained above was added to this dispersion with stirring. The product was filtered, to remove particles greater than 1 $\mu$m in size. A homogeneous ink-jet ink that was curable under UV-A or UV-B or UV-C light was obtained.

EXAMPLE 2

To 1600 parts N-vinyl-2-pyrrolidinone were added 60 parts KSCN, and mixed until dissolved. The photoinitiator isopropylthioxanthone (40 parts) and the activator ethyl diaminobenzoate (120 parts) were then added, and mixed until dissolved. Hexanediol diacrylate (1000 parts) was added quickly, with stirring.

The mixture was added to 200 parts of the same pigment-in-polymer-in-monomer dispersion as in Example 1, with stirring. The product was filtered, to remove particles greater than 1 $\mu$m in size. A homogeneous ink-jet ink that was curable under UV-C light was obtained.

EXAMPLES 3 and 4

Examples 1 and 2 were repeated, except that, in each case, the KSCN was replaced by 5% polyvinyl butyral.

More generally, except for the absence of conductive component, a non-conductive ink of the invention can have any of the characteristics (claimed or otherwise) of a conductive ink of the invention.

What is claimed is:

1. An ink-jet ink free of volatile solvents comprising an admixture of colorant, a water-soluble polar conductive material and liquid phase, wherein said liquid phase consists essentially of polymerisable monomers and wherein said water-soluble polar conductive material is dissolved in said liquid phase.

2. An ink according to claim 1, which comprises 50 to 95% by weight of said polymerisable monomers.

3. An ink according to claim 1, which comprises, by weight thereof, up to 70% monofunctional monomer, up to 70% difunctional monomer, and 0 to 10% tri- or higher-functional monomer.

4. An ink according to claim 3, which comprises 25 to 60% by weight of said monofunctional monomer and 20 to 60% by weight of said difunctional monomer.

5. An ink according to claim 1, which is UV-A light-curable.

6. An ink according to claim 1, which comprises a photoinitiator and, optionally, a photoactivator.

7. An ink according to claim 6, which comprises 1 to 10% by weight of said photoinitiator and 0 to 5% by weight of said photoactivator.

8. An ink according to claim 1, which comprises 0.5 to 5% by weight of said water-soluble polar conductive material.

9. An ink according to claim 1, wherein said water-soluble polar conductive material is potassium thiocyanate.

10. An ink according to claim 1, which comprises 0.5 to 5% by weight of said colorant.

11. An ink according to claim 1, wherein said colorant is black.

12. An ink according to claim 1, wherein said colorant is a dispersed pigment.

13. A method of printing a substrate by ink-jet printing, which comprises the steps of applying continuously to the substrate an ink-jet ink, and curing the printed substrate, wherein said ink-jet ink comprises an admixture of colorant, a water-soluble polar conductive material and liquid phase, wherein said liquid phase consists essentially of polymerisable monomers, wherein said water-soluble polar conductive material is dissolved in said liquid phase, and wherein said ink-jet ink is free of volatile solvents.

14. A method according to claim 13, in which said ink comprises 50 to 95% by weight of polymerisable monomers.

15. A method according to claim 13, in which said ink comprises, by weight thereof, up to 70% monofunctional monomer, up to 70% difunctional monomer, and 0 to 10% tri-or higher-functional monomer.

16. The method according to claim 13, in which the printed substrate is cured by UV-A light.

17. A non-conductive ink comprising a colorant, a liquid phase consisting essentially of polymerisable monomers and a polymeric or further polymerizable material whose presence provides increased viscosity of up to 50 cP at 25° C.

* * * * *

(12) EX PARTE REEXAMINATION CERTIFICATE (6848th)
United States Patent
Marshall et al.

(10) Number: US 5,275,646 C1
(45) Certificate Issued: Jun. 2, 2009

(54) INK COMPOSITION

(75) Inventors: Allan Marshall, Lincs (GB); Alan I. Hudd, Herts (GB)

(73) Assignee: Domino Printing Sciences PLC, Cambridge (GB)

Reexamination Request:
No. 90/009,241, Aug. 4, 2008

Reexamination Certificate for:
Patent No.: 5,275,646
Issued: Jan. 4, 1994
Appl. No.: 07/912,577
Filed: Jul. 13, 1992

Related U.S. Application Data

(63) Continuation-in-part of application No. 07/720,155, filed on Jun. 27, 1991, now abandoned.

(30) Foreign Application Priority Data

Jun. 27, 1990 (GB) .............................. 9014299
Oct. 30, 1991 (GB) .............................. 9123070

(51) Int. Cl.
*C09D 11/10* (2006.01)
*C09D 11/00* (2006.01)

(52) U.S. Cl. ...................... 106/31.32; 347/100; 427/511
(58) Field of Classification Search ........................ None
See application file for complete search history.

(56) References Cited

U.S. PATENT DOCUMENTS

| 3,847,771 A | * | 11/1974 | McGinniss | 522/9 |
| 3,857,769 A | * | 12/1974 | McGinniss | 522/26 |
| 4,137,139 A | * | 1/1979 | Seltzer et al. | 522/167 |
| 4,303,924 A | * | 12/1981 | Young, Jr. | 347/102 |
| 4,525,258 A | * | 6/1985 | Watanabe et al. | 522/14 |
| 4,978,969 A | * | 12/1990 | Chieng | 347/102 |

FOREIGN PATENT DOCUMENTS

| DE | 2349280 A | * | 4/1975 |
| DE | 189125 A1 | * | 1/1986 |
| EP | 161463 A1 | * | 11/1985 |
| EP | 187045 A2 | * | 7/1986 |
| EP | 465039 A1 | * | 1/1992 |
| GB | 1449752 A | * | 9/1976 |
| GB | 2025996 A | * | 1/1980 |
| GB | 2233928 A | * | 1/1991 |
| JP | 60-132767 A | * | 7/1985 |

OTHER PUBLICATIONS

Holman, R. UV and EB Curing Formulations for Printing Inks, Coatings and Paints, 1984.*
Encyclopedia of Polymer Science and Engineering, vol. 13, p. 387. J. Wylie and Sons, 1988.*
Leach, The Printing Ink Manual, 4th Ed., pp. 540–544, 1988.*
Kang, Water–Based Ink–Jet Ink: I. Formulation; Journal of Imaging Science 35, p. 179–188, 1989.*
Croucher, Design Criteria and Future Directions in Ink Jet Ink Technology, Ind. Eng. Chem. Res. 28, pp. 1712–1718 (1989).*
Dougherty et al., Vinyl Ethers for Cationic UV Curing, Soc. Of Manufacturing Engineers, FC86–840, 1986.*
GAF Product Bulletin for V–Pyrol®/RC vinylpyrrolidone a reactive diluent used in radiation curable coatings/inks on metal products, GAF Corporation, 1979.*
Vara et al, Vinyl Ether in UV and EB–Induced Cationic Curing, Water Borne and Higher Solids Coatings Symposium, Feb. 21, 1990.*

* cited by examiner

*Primary Examiner*—Stephen J Stein

(57) ABSTRACT

An ink-jet ink comprises a colorant and a liquid phase consisting essentially of polymerisable monomers. For continuous printing, the ink also includes a conductive component that is soluble in the liquid phase. No methanol, ethanol, MEK or other such low molecular weight organic solvent is required.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 17 is determined to be patentable as amended.

New claims 18–31 are added and determined to be patentable.

Claims 1–16 were not reexamined.

17. A *UV-curable* non-conductive ink *for piezoelectric drop-on-demand ink-jet printing*, comprising a colorant, *a photoinitiator,* a liquid phase consisting essentially of polymerisable monomers and a polymeric or further polymerisable material whose presence provides increased viscosity of up to 50 cP at 25° C. *and which is free from volatile organic solvent, wherein the monomers comprise 25 to 60% by weight monofunctional monomer and 20–70% by weight difunctional monomer.*

*18. The UV curable non-conductive ink of claim 17 which contains a photoactivator.*

*19. The UV curable non-conductive ink of claim 17 which contains a photosynergist.*

*20. The UV curable non-conductive ink of claim 17 which contains a stabilizer.*

*21. The UV curable non-conductive ink of claim 17 which contains a wetting agent.*

*22. The UV curable non-conductive ink of claim 17 which contains a surfactant.*

*23. The UV curable non-conductive ink of claim 17 which further contains up to 10% by weight of tri or higher-functional monomer.*

*24. The UV curable non-conductive ink of claim 17 which contains from 20 to 60% difunctional monomer.*

*25. The UV curable non-conductive ink of claim 17 which contains from 30 to 50% by weight difunctional monomer.*

*26. The UV curable non-conductive ink of claim 17 wherein the monofunctional monomer is selected from the group consisting of vinyl compounds and (meth)acrylic acid esters.*

*27. The UV curable non-conductive ink of claim 17 wherein the monofunctional monomer is selected from the group consisting of octyl acrylate, decyl acrylate, nonylphenol ethoxylate acrylate, N-vinylpyrrolidone, ethyl diglycol acrylate, isobornyl acrylate, ethylhexyl acrylate, lauryl acrylate, butanediol monoacrylate, β-carboxyethyl acrylate, isobutyl acrylate, polypropylene glycol monomethacrylate and 2-hydroxyethyl methacrylate.*

*28. The UV curable non-conductive ink of claim 17 wherein the monofunctional monomer is selected from the group consisting of vinyl ethers, monofunctional cycloaliphatic epoxides and α-epoxides.*

*29. The UV curable non-conductive ink of claim 17 wherein the difunctional monomers are difunctional (meth)acrylic acid esters.*

*30. The UV curable non-conductive ink of claim 17 wherein the difunctional monomers are selected from the group consisting of hexanediol di(meth)acrylate, tetraethylene glycol diacrylate, tripropylene glycol diacrylate, butanediol diacrylate, polyethylene glycol diacrylates and triethylene glycol dimethacrylate.*

*31. The UV curable non-conductive ink of claim 17 wherein the difunctional monomers are selected from the group consisting of triethylene glycol divinyl ether, 1,4-cyclohexanedimethanol divnyl ether, butanediol diglycidyl ether and a difunctional cycloaliphatic epoxide resin.*

\* \* \* \* \*